United States Patent [19]
Enomoto et al.

[11] Patent Number: 5,329,099
[45] Date of Patent: Jul. 12, 1994

[54] METHOD OF MAINTAINING HOUSING OF REACTOR PRESSURE VESSEL AND HEAT TREATMENT EQUIPMENT THEREFOR

[75] Inventors: Kunio Enomoto, Ibaraki; Masahiro Otaka, Hitachi; Kunio Hasegawa, Katsuta; Makoto Hayashi, Hitachi; Shinji Sakata, Katsuta; Hideyo Saito; Koichi Kurosawa, both of Hitachi; Takashi Saito, Katsuta; Yoshinori Karatsu, Takahagi; Motoya Ito, Katsuta, all of Japan

[73] Assignee: Hitachi, Ltd., Tokyo, Japan

[21] Appl. No.: 704,289

[22] Filed: May 22, 1991

[30] Foreign Application Priority Data

May 24, 1990 [JP] Japan .................. 2-134803

[51] Int. Cl.⁵ .............................. B23K 13/01
[52] U.S. Cl. ................... 219/604; 219/607; 219/611; 219/614
[58] Field of Search ............ 219/10.41, 10.491, 10.57, 219/10.67, 10.79; 376/260; 148/135

[56] References Cited

U.S. PATENT DOCUMENTS

| | | | |
|---|---|---|---|
| 3,525,842 | 8/1970 | Steinhoff et al. | 219/10.41 |
| 3,757,072 | 9/1973 | Delpaggio | 219/10.41 |
| 4,309,583 | 1/1982 | Krauss et al. | 219/10.67 |
| 5,022,936 | 6/1991 | Tsujimura et al. | 148/135 |
| 5,047,201 | 9/1991 | Schmidt et al. | 219/10.491 |
| 5,085,569 | 2/1992 | Dauphin | 219/10.57 |
| 5,227,124 | 7/1993 | Saito et al. | 376/260 |

FOREIGN PATENT DOCUMENTS

131923 7/1985 Japan .
135526 7/1985 Japan .

*Primary Examiner*—Bruce A. Reynolds
*Assistant Examiner*—Tu Hoang
*Attorney, Agent, or Firm*—Antonelli, Terry, Stout & Kraus

[57] ABSTRACT

A method of maintaining the housing of a reactor pressure vessel having: a reactor pressure vessel into which cooling water is introduced; a cylindrical housing which penetrates an end bracket of the reactor pressure vessel; and a circumferential weld for securing the intermediate portion of the housing to the reactor pressure vessel by welding, the method of maintaining a housing of a reactor pressure vessel comprising the steps of: remaining the cooling water in the reactor pressure vessel; preventing leakage of the cooling water in the reactor pressure vessel through the housing by sealing the housing; making the inside portion of the housing lower than the seal to be a hollow space of a gas atmosphere; heating a heat affected zone due to welding by using a heating device inserted into the hollow space from a lower portion so as to compressive-yield the inner surface of the housing in the heat affected portion upper than the circumferential weld and tensile-yield the outer surface; and cooling heated portion inside of the housing, which has been yielded, so as to tensile-yield the inner surface of the housing by using a cooling device inserted into the housing from a lower portion, whereby compressive stress is allowed to remain in the tensile-yielded portion.

22 Claims, 14 Drawing Sheets

DISTRIBUTION OF RESIDUAL STRESS ON
INNER AND OUTER SURFACES AFTER BEING
TREATED BY HEATING ACCORDING TO THE INVENTION

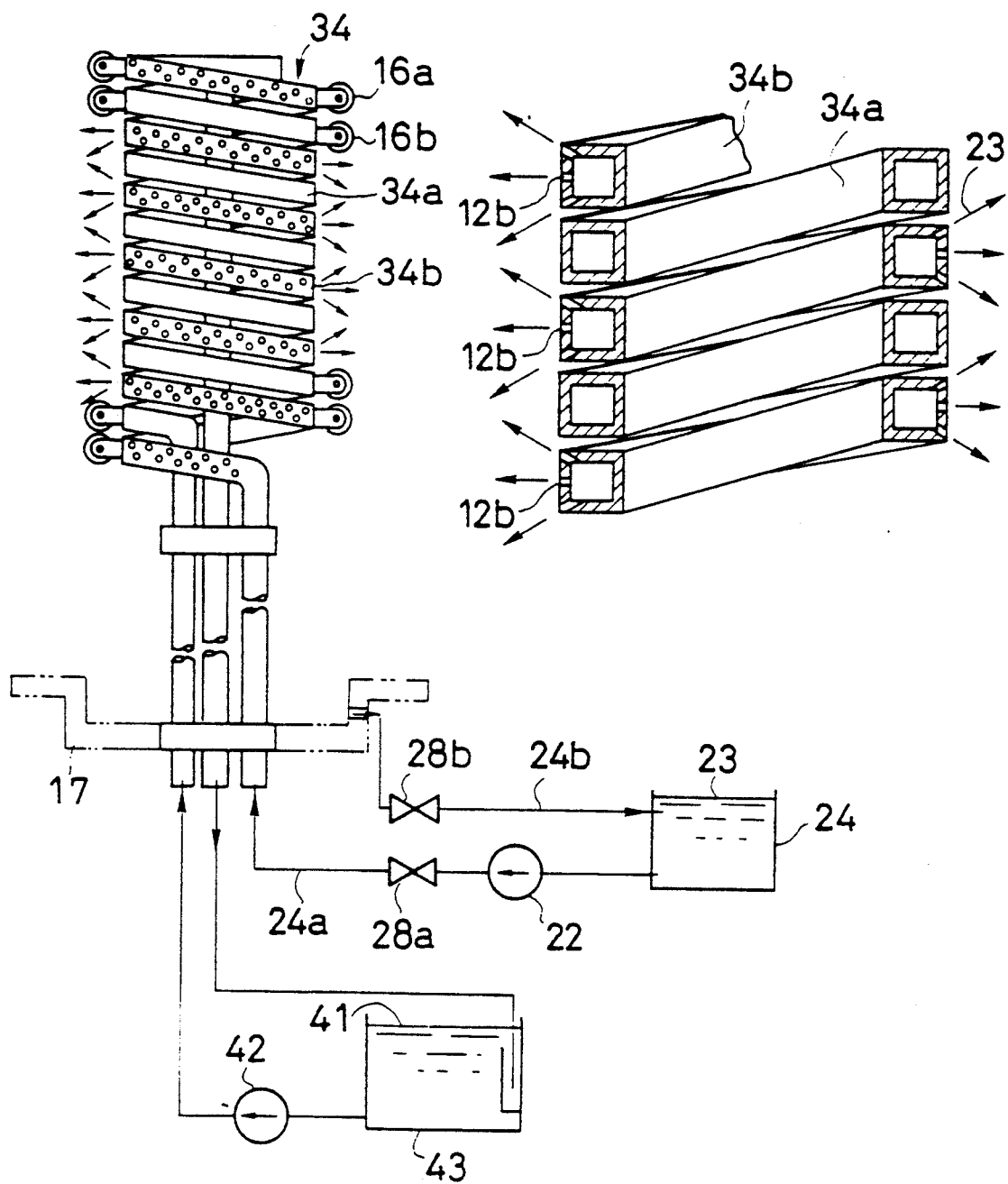

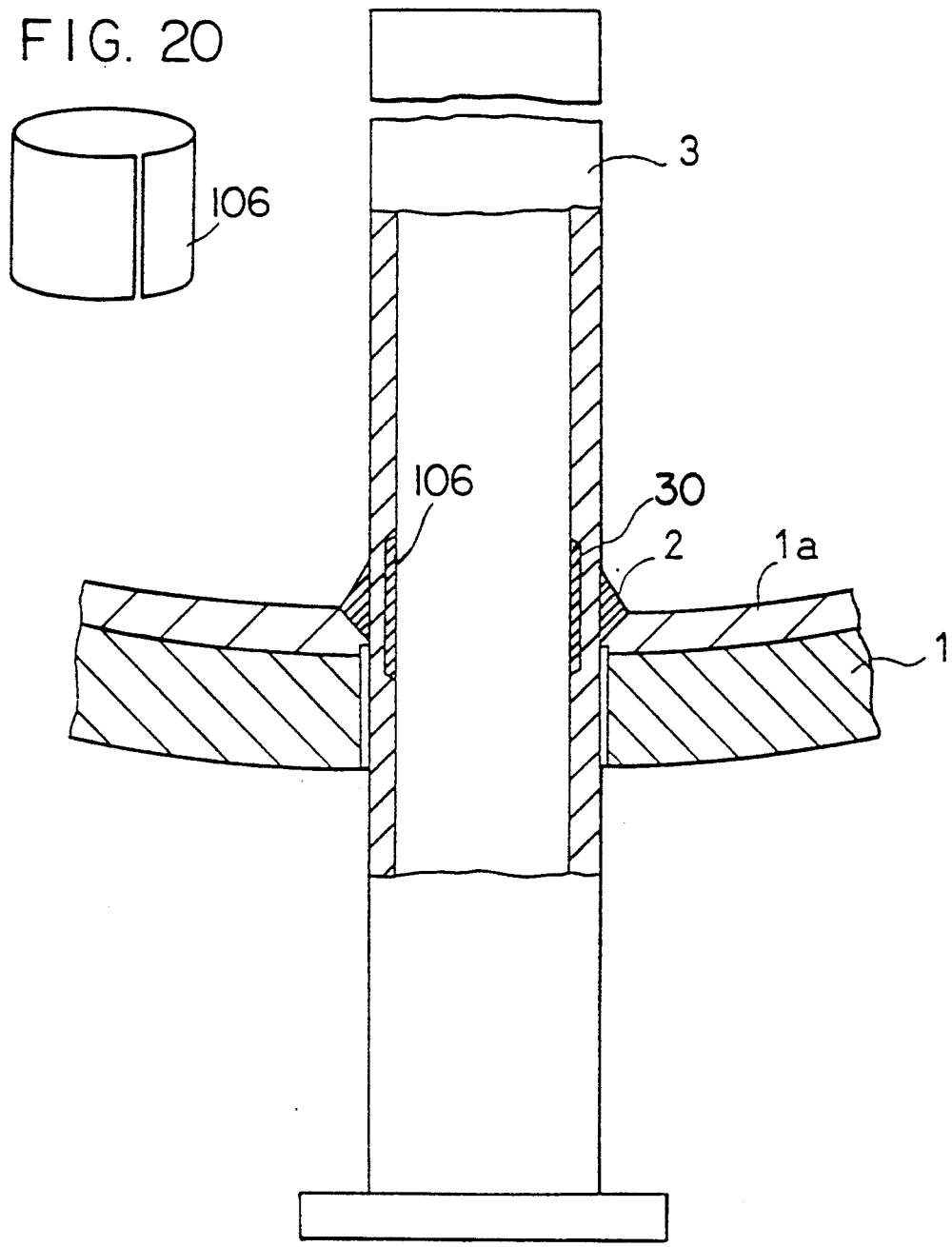

METHOD OF MAINTAINING HOUSING OF REACTOR PRESSURE VESSEL AND HEAT TREATMENT EQUIPMENT THEREFOR

BACKGROUND OF THE INVENTION

1. Field of the Invention

The present invention relates to a technology capable of satisfactorily preventing stress corrosion cracking of a housing fastened, by welding, to an end bracket in the lower portion of a reactor pressure vessel.

2. Description of the Related Art

A variety of housings penetrate an end bracket in the lower portion of a reactor pressure vessel, the housing being secured by welding.

An example will now be described with reference to a case of an in-core monitor housing.

As shown in FIG. 16, an end bracket plate 1 in the lower portion of the reactor pressure vessel is composed of a body member 1b of the end bracket 1 and an inner clad portion 1a applied to the inner surface of the body member 1b, the inner clad portion 1a being made of a material exhibiting excellent corrosion resistance.

Hitherto, as shown in FIG. 16, the in-core monitor housing (hereinafter simply called a "housing") and the end bracket plate 1 of the reactor pressure vessel have been joined with each other in such a manner such that a cylindrical housing 3 made of SUS304 stainless steel is inserted into a through hole formed in the end bracket plate 1 and then the outer surface of an intermediate portion of the housing 3 is subjected to a circumferential weld with an inside clad 1a of the end bracket plate 1.

However, an undesirable sensitized zone 8a, the corrosion resistance of which is deteriorated due to an affection of weld heat, is continuously formed in the portion of the housing 3 adjacent to the circumferential weld 2 in the circumferential shape.

A tensile residual stress, the level of which reaches the yield point of the material, is sometimes present in the vicinity of the weld portion. Furthermore, when the nuclear reactor is operated, high temperature and high pressure primary water in the reactor pressure vessel also comes in contact with the outer and inner surfaces of the housing 3 higher than the circumferential weld 2. Therefore, triple factors, that is, a corrosive environment, reduction in the tensile stress and deterioration of the corrosion resistance are able to be simultaneously present in the circumferential weld 2 and its adjacent portions.

The above-described simultaneously-present factors will cause a stress corrosion cracking to be easily generated in the portion of the housing 3 in the vicinity of the circumferential weld. Furthermore, resistance against corrosive environment such as that against the corrosion fatigue will be deteriorated, causing the safety of the housing made of SUS304 to be critically deteriorated.

FIG. 17 illustrates an example of a housing the inner surface of which is applied with a surface reform treatment for the purpose of improving the portion in which the above-described three factors have been present.

That is, a surface reformed portion 9 is formed on the inner surface of the housing 3 so that the sensitized zone 8a shown in FIG. 16 cannot come in contact with primary water in the reactor pressure vessel in the housing. As the surface reform treatment, there has been available a method which is arranged in such a manner that the inner surface of the sensitized zone 8a, which has reached the inner surface of the housing, is simply remelted by using a nonconsumable electrode such as a TIG welding electrode without the filler metal. As a result, the sensitized zone 8a is given high density energy so that the sensitized structure is improved. Another method can be employed in which high corrosion resistant metal is clad-welded to the inner surface of the sensitized zone 8a. The above-described methods have been disclosed in U.S. patent application Ser. No. 07/445,535 and 07/561,684. However, even if the above-described remelting method or the clad-welding method are employed to reform the surface, a sensitized zone is formed in vertical end portions 10a and 10b of the reformed portion due to the heat affection at the time of the remelting operation or the clad welding operation although its degree is not considerably large. As a result, the tensile residual stress is undesirably generated.

Accordingly, there is a desire to improve the corrosive environment of the housing 3 while eliminating the remelting work or the welding work from the housing 3.

On the other hand, the inner surface of the housing 3 and the outer surface of the same which is higher than the circumferential weld 2 are positioned in contact with primary water in the reactor pressure vessel. Therefore, there is a desire to improve the corrosive environment of the above-described two surfaces.

Furthermore, the portion of the housing 3 of the reactor pressure vessel higher than the circumferential weld 2 is submerged in primary water in the reactor pressure vessel and primary water is contaminated and its quantity is great. Therefore, there is a desire to improve the corrosive environment of the two sides of the housing without removing primary water of the great quantity. Therefore, there is a desire to subject the housing 3 to a work for improving the corrosive environment performed from the inside portion of the housing 3.

As described above, since the housing of the reactor pressure vessel is used under special conditions, a multiplicity of requirements must be met when the work for improving the heat affected zone is performed.

Therefore, it might be considered feasible to employ technologies disclosed in Japanese Patent Application Laid-Open No. 60-131923 (1985) and Japanese Patent Application Laid-Open No. 60-135526 (1985).

According to Japanese Patent Application Laid-Open No. 60-131923 (1985), a technology has been disclosed about a duplex tube structure arranged in such a manner that an intermediate portion of the outer surface of an inner tube is welded to the end portion of the outer tube, the technology being characterized in that: the duplex tube is heated by a heating coil disposed in the inner tube, a cooling medium is allowed to pass through the inside portion of the inner tube and the cooling medium is sprayed to the outer surface of the outer tube so that the compressive residual stress is generated on the inner surface of the inner tube and the outer surface of the outer tube which are positioned in contact with the above-described cooling medium.

However, in a case where the housing is sealed so as to prevent the leakage of primary water in the reactor pressure vessel through the housing, a state in which the cooling medium passes through the inside portion of the housing cannot be realized. Therefore, the above-described technology cannot be preferably applied to the housing of the reactor pressure vessel. Furthermore, the technology of generating the compressive residual stress on each of the inner and the outer surfaces of the housing by the heat treatment performed from the inside portion of the housing of the reactor pressure vessel while remaining the primary water in the reactor pressure vessel has not been disclosed. In addition, the above-described technology includes no method and means for using primary water in the reactor pressure vessel as the cooling medium. According to the above-described technology, heating and cooling of the inner surface of the inner tube are simultaneously performed at the time of the heat treatment process. Therefore, it has been difficult to obtain the temperature difference which is sufficiently large to yield the housing in terms of the stress even if the above-described heat treatment technology is applied to the housing.

According to Japanese Patent Application Laid-Open No. 60-135526 (1985), a technology has been disclosed about a duplex tube structure arranged in such a manner that an intermediate portion of the outer surface of an inner tube is welded to the end portion of the outer tube, the technology being characterized in that: the duplex tube is heated by a heating coil disposed in the inner tube and the inner surface of the inner tube in a region which overlaps the outer tube and the outer surface of each of the inner tube and the outer tube are cooled by the cooling medium sprayed. As a result, the compressive residual stress is generated in the surfaces which are positioned in contact with the above-described cooling medium. According to this technology, the compressive residual stress is not generated in the inner surface of the inner tube in the region which does not overlap the outer tube with respect to the weld portion.

According to the above-described technology, the method and means of heat treatment in which primary water in the reactor pressure vessel is utilized as the cooling medium has not been disclosed. Furthermore, the technology has not been disclosed in which the compressive residual stress is generated in the overall region of the heat affected zone of the welded portion because the compressive residual stress remains in the inner surface of the inner tube of the region which does not overlap the outer tube with respect to the welded portion. In addition, according to the above-described technology, since heating and cooling of the inner surface of the inner tube are simultaneously performed, the temperature difference which is satisfactorily large to yield the housing in terms of stress cannot be easily obtained between the inner surface of the housing and the outer surface of the same even if the above-described heat treatment technology is applied to the housing of the reactor pressure vessel. Furthermore, the temperature difference which is sufficiently large to yield the housing in terms of stress cannot quickly and assuredly obtained.

SUMMARY OF THE INVENTION

Accordingly, an object of the present invention is to provide a heat treatment method and a heat treatment equipment capable of overcoming the above-described conventional problems and quickly and assuredly improving the corrosive environment of the housing of a reactor pressure vessel.

According to one aspect of the present invention, there is provided a method of maintaining the housing of a reactor pressure vessel having: a reactor pressure vessel into which cooling water is introduced; a cylindrical housing which penetrates an end bracket of the reactor pressure vessel; and a circumferential weld for securing the intermediate portion of the housing to the reactor pressure vessel by welding, the method of maintaining a housing of a reactor pressure vessel comprising the steps of: retaining the cooling water in the reactor pressure vessel; preventing leakage of the cooling water in the reactor pressure vessel through the housing by sealing the housing; making the inside portion of the housing lower than the seal to be a hollow space of a gas atmosphere; heating a heat affected zone due to welding by using heating means inserted into the hollow space from a lower portion so as to compressive-yield the inner surface of the housing in the heat affected portion higher than the circumferential weld and tensile-yield the outer surface; and cooling heated portion inside of the housing, which has been yielded, so as to tensile-yield the inner surface of the housing by using cooling means inserted into the housing from a lower portion, whereby compressive stress is allowed to remain in the tensile-yielded portion.

According another aspect of the present invention, there is provided a heat treatment equipment for heat-treating the housing of a reactor pressure vessel comprising: a cylindrical housing penetrating an end bracket of the reactor pressure vessel and an intermediate portion of which is secured to the reactor pressure vessel at a circular weld; a heating coil of an induction heating device having an outer diameter with which the heating coil can be inserted into the housing and which is vertically distributed so as to cover the vertical region of an weld heat affected region to be improved; and a nozzle hole portion having a diameter with which the nozzle hole portion can be inserted into the housing and distributed in a region capable of covering the weld heat affected zone, wherein the nozzle holes are formed in a hollow pipe member having a diameter with which the hollow pipe can be inserted into the housing, the heating coils are fastened in series to the upper portion of the pipe member, the pipe member is, as a water passage connected to the nozzle holes, to cooling water supply means and the pipe member and the heating coil are supported by a lifting drive device in such a manner that they can be moved vertically.

According to another aspect of the present invention, there is provided a heat treatment equipment for heat-treating the housing of a reactor pressure vessel comprising: a cylindrical housing penetrating an end bracket of the reactor pressure vessel and an intermediate portion of which is secured to the reactor pressure vessel at a circular weld; a coil having a diameter with which the coil can be inserted into the cylindrical housing and vertically distributed so as to be capable of covering the vertical directional range of a weld heat affected zone to be improved, the coil being present in the form of a double thread screw-like coil, wherein either of the double thread screw-like coil is a coil with a hollow cross sectional shape, the double thread screw-like coil has nozzle holes facing inside of the housing, cooling water supply means is connected to the either coil and another coil is a heating coil of an induction heating device.

According to another aspect of the present invention, there is provided a heat treatment equipment for heat-treating the housing of a reactor pressure vessel comprising: an induction heating device having a diameter with which the induction heating device can be inserted into a cylindrical housing, which penetrates an end bracket of the reactor pressure vessel and an intermediate portion of which is secured to the reactor pressure vessel at a circular weld, the induction heating device having a plurality of heating coils vertically disposed away from one another to confront the two vertical end portions improved surface layer of the inner surface of the housing; and a cooling device having nozzle holes distributed to cover the inner surface of the housing which confronts the plurality of heating coils and cooling water supply means connected to the nozzle holes.

According to another aspect of the present invention, there is provided a heat treatment equipment for heat-treating the housing of a reactor pressure vessel comprising: seal to be applied to a cylindrical housing, which penetrate an end bracket of the reactor pressure vessel and an intermediate portion of which is secured to the reactor pressure vessel at a circumferential weld; a cooling pipe in the form of a duplex tube having an outer diameter with which the cooling pipe can be inserted into the housing in the portion below the seal from a lower portion; nozzle holes formed in an outer tube of the cooling pipe and distributed in a range capable of covering a region to be heat-treated, the nozzle holes facing the inside portion of the housing; heating coils of an induction heating device fastened to the upper portion of the cooling pipe, having an outer diameter with which the heating coils can be inserted into the portion of the housing below the seal from a lower portion and distributed in a range capable of covering a region to be heat-treated; a guide fastened to either or both the heating coil and the cooling pipe and acts to guide the heating coil and the cooling pipe along the central axis of the housing; a power supply cable electrically connected to the heating coil and arranged to pass through the inner tube of the cooling pipe so as to be ejected from the cooling pipe; a transformer electrically connected to the power supply cable so as to supply power from a power supply to the power supply cable; a lower cover in which the cooling pipe is combined in such a manner that the cooling pipe is able to move vertically and which is combined with the lower end portion of the housing; a circular fluid passage for fluidly connecting the inside portion of the lower cover and the inside portion of the outer tube of the cooling pipe; a tank for a cooling medium disposed at an intermediate portion of the circulation fluid passage; a pump provided for the circulation fluid passage for giving circulating pressure to the cooling medium in the tank; and a lifting device mechanically connected to the cooling pipe.

According to another aspect of the present invention, there is provided a heat treatment equipment for heat-treating the housing of a reactor pressure vessel comprising: seal to be applied to a cylindrical housing, which penetrate an end bracket of the reactor pressure vessel and an intermediate portion of which is secured to the reactor pressure vessel at a circumferential weld; a cooling pipe in the form of a coil having an outer diameter with which the cooling pipe can be inserted into the housing in the portion below the seal from a lower portion, the cooling pipe being distributed in a range capable of covering a region to be heat-treated; nozzle holes formed in the cooling pipe to face the outside portion of the coil; heating coils of an induction heating device distributed to form a double coil together with the cooling pipe in a range capable of covering a region to be heat-treated and having an outer diameter with which the heating coils can be inserted into the portion of the housing below the seal from a lower portion; a guide fastened to either or both the heating coil and the cooling pipe and acts to guide the heating coil and the cooling pipe along the central axis of the housing; a power supply cable electrically connected to the heating coil; a transformer electrically connected to the power supply cable so as to supply power from a power supply to the power supply cable; a lower cover for supporting the cooling pipe and the heating coil and combined with the lower end opening of the housing; a circular fluid passage for fluidly connecting the inside portion of the lower cover and the cooling pipe; a tank for a cooling medium disposed at an intermediate portion of the circulation fluid passage; and a pump provided for the circulation fluid passage for giving circulating pressure to the cooling medium in the tank.

Other and further objects, features and advantages of the invention will be appear more fully from the following description.

BRIEF DESCRIPTION OF THE DRAWINGS

FIG. 14 is a structural view which illustrates the combination of the heating coil and a cooling pipe adaptable to the embodiments of the present invention;

FIG. 15 is a partial cross sectional view which illustrates an enlarged coil shown in FIG. 14;

FIG. 19 is a partial cross-sectional view which illustrates a thin metal sleeve inserted into the cut or ground portion of the housing of the reactor pressure vessel; and FIG. 20 is a perspective view of a thin metal sleeve for insertion into a cut or ground portion of the housing of the reactor presser vessel.

DESCRIPTION OF PREFERRED EMBODIMENTS

Figure 1:
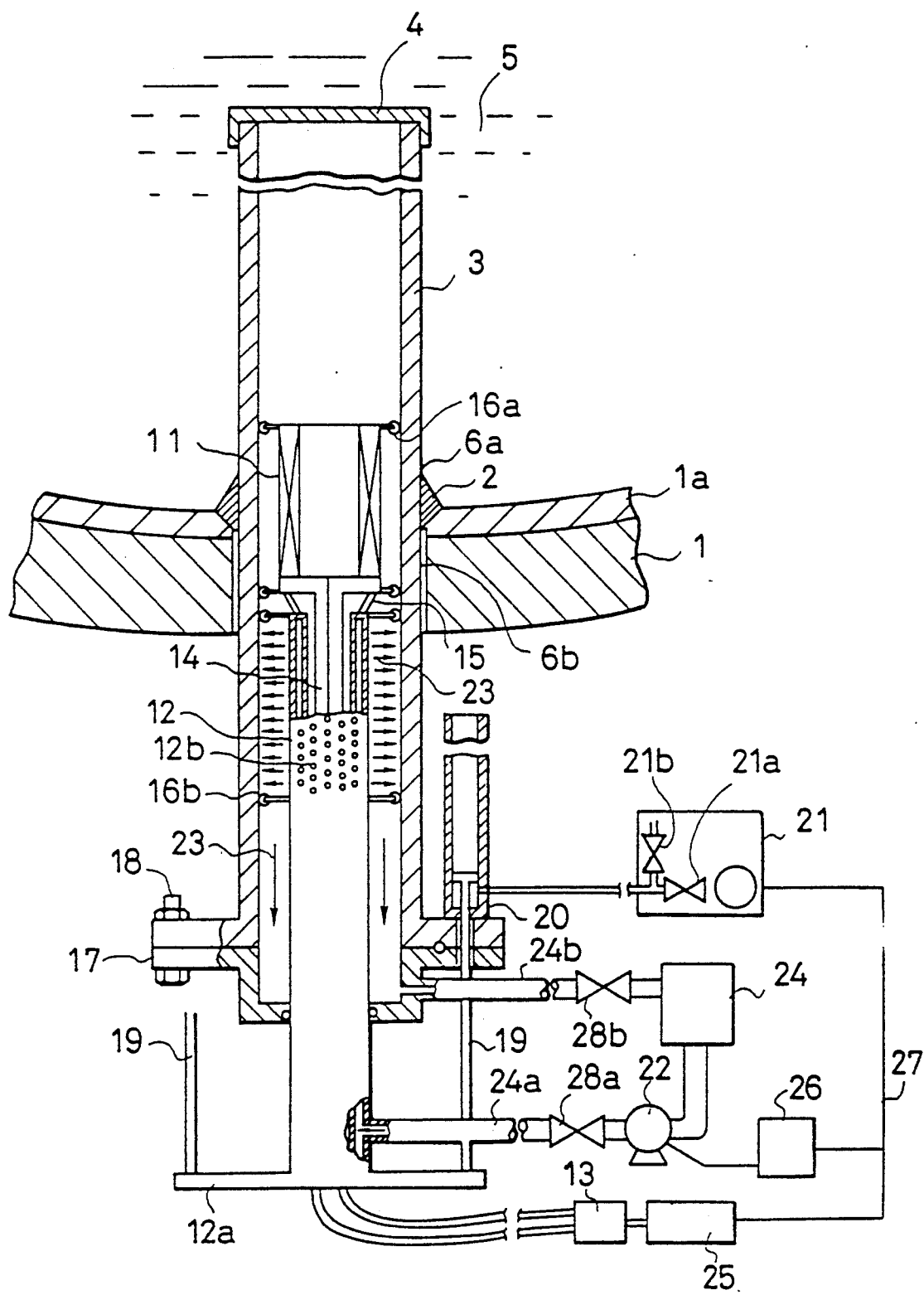
FIG. 1 is a partial cross sectional view which illustrates the overall structure of a first embodiment of a heat treatment equipment for an in-core monitor housing (hereinafter simply called a housing) of a reactor pressure vessel according to the present invention.

Referring to FIG. 1, a cylindrical in-core monitor housing 3 (hereinafter simply called a "housing 3") made of SUS 304 is inserted into a through hole formed in a bracket 1 of a reactor pressure vessel. The in-core monitor housing 3 is secured by welding to the upper surface of the bracket in the lower portion of the reactor pressure vessel, that is, the inner surface of the same at a circumferential weld 2 in such a manner that the in-core monitor housing 3 vertically projects over the bracket 1.

A cap 4 for water-sealing the housing 3 is fastened to the top end portion of the housing 3. In the housing 3, a high frequency heating coil 11 and a cooling pipe 12 are disposed. The high frequency heating coil 11 and the cooling pipe 12 are vertically connected to each other by a connector 15.

The cooling pipe 12 is constituted as follows: a hollow cylindrical duplex tube 12 composed of an inner tube and an outer tube, which are concentrically disposed, has nozzle holes 12b in the upper portion of the above-described outer tube, the nozzle holes 12b being dispersedly formed in the circumferential direction and the vertical direction. The nozzle holes 12b thus disposed are arranged to face the inner surface of the housing 3. The two vertical ends between the outer tube and the inner tube, which constitute the duplex tube, are sealed up so as to prevent water leakage.

The duplex tube 12 thus-arranged vertically movably penetrates a lower cover 17 which is, by a bolt 18, fastened to a flange formed at the lower end portion of the housing 3. A flexible and heat resistant covered cable 14 passes through a hollow cylindrical space in the central portion of the cooling pipe 12, an end of the cable 14 being connected to the heating coil 11. Another end of the cable 14 is connected to a transformer 13 disposed outside the housing. The transformer 13 is able to transmit electric power from a high frequency power supply.

Rollers 16a and 16b are respectively disposed on the outer surfaces of the heating coil 11 and the cooling pipe 12, the rollers 16a and 16b acting to maintain the distances between the heating coil 11 and the cooling pipe 12 and the inner surface of the housing 3 and to serve as a guide at the time of inserting/removing the same. The roller 16a and 16b are made of bakelite having an electrical insulating characteristic so that the electrical insulation is established between the heating coil 11 and the inner surface of the housing 3.

A horizontal bottom plate 12a is secured to the lower end portion of the cooling pipe 12. A piston rod portion 19 of a lifting device is connected to the bottom plate 12a. The lifting device is composed of a cylinder 20 disposed in the flange formed in the lower portion of the housing 3, a piston rod portion 19 extending downward from the cylinder 20 while penetrating the flange formed in the lower portion of the housing 3 and the lower cover 17 and a cylinder control unit which controls the forward movement of the piston rod portion 19 in the downward direction and the retracting movement of the same into the cylinder by supplying pressure into a chamber formed below the cylinder or removing pressure from the chamber.

A space present between the outer tube and the inner tube of the cooling pipe 12 is used as the passage connected to the nozzle holes 12b. The above-described space is connected by a pipe 24a to an outlet port of a pump 22 via a valve 28a. The inlet port of the pump 22 is connected to the bottom portion of a cooling-water reservoir chamber 24. The upper portion of the reservoir chamber 24 is, via a valve 28b, connected to the lower cover 17 by a flexible pipe 24b. Thus, a circulation passage is constituted.

An induction heating device includes the heating coil 11, the covered cable 14 connected to the heating coil 11 and arranged to pass through the inner tube of the cooling pipe 12, the transformer 13 connected to the above-described cable 14 and a induction-heating power supply and control unit 25 connected to the transformer 13. Furthermore, the power supply and control unit 25 is connected to a cylinder control unit 21 and a pump control unit 26 for the pump 22 by a signal line 27.

The axial length (in the vertical direction) of the heating coil 11 is arranged to be a length with which the inner surface of the housing 3 in a range, which corresponds to the circumferential weld 2 of the housing 3 and its heat affected zones 6a and 6b, that is, the inner surface of the weld region can be sufficiently heated. Also the positions of the nozzle holes 12b are dispersed in the vertical direction and the circumferential direction of the range with which its circumferential weld 2 and the heat affected zones 6a and 6b can be cooled.

The central height of the heating coil 11 in the vertical direction can be varied by the lifting device to correspond to the position of the circumferential weld 2 at the time of heating, while the central height of the dispersion region of the nozzle holes 12b can be varied by the same to correspond to the position of the circumferential weld 2.

According to the structure of the first embodiment thus arranged, the operation of maintaining the housing 3 is performed as follows:

The cap 4 is fitted to the top end portion of the housing 3 so as to seal the housing 3 from primary water 5 in the reactor pressure vessel.

Then, the above-described elements in the housing 3 are downwards pulled out so as to make the inside portion of the housing 3 to be a hollow space.

Then, the heating coil 11 and the cooling pipe 12 are inserted into the housing 3. At the time of the above-described inserting operation, the rollers 16a rotate on the inner surface of the housing 3 so that the heating coil 11 and the cooling pipe 12 are positioned to the central portion of the housing and they are smoothly inserted.

Then, the flange formed at the lower end of the housing 3 and the lower cover 17 are secured to each other by means of the bolt 18 inserted into them. At the time of the above-described securing operation, it is preferable that an annular seal be placed between the flange and the lower cover 17. The piston rod portion 19 is inserted into the flange formed at the lower end of the housing 3 and the lower cover 17 so that the portion of the cylinder 20 is disposed in the form of the flange. The lower end portion of the piston rod portion 19 is connected to the bottom plate 12a. As described above, the lifting device supports the heating coil 11 and the cooling pipe 12.

Then, the valve 21a is opened and as well as the valve 21b is closed so that pressure is supplied by the cylinder control unit 21 to the lower chamber of the cylinder 20, causing the piston rod portion 19 to be retracted into the cylinder 20.

Since the piston rod portion 19 is retracted into the cylinder 20, the cooling pipe 12 and the heating coil 11 are upward moved in the housing 3. When the central portion of the height of the heating coil 11 in the direction of its height reaches the height of the circumferential weld 2, the valve 21a is closed so that the upward movement of the cooling pipe 12 and the heating coil 11 is stopped.

Then, an AC is controlled by the power supply and control unit 25 so as to be supplied from the transformer 13 to the heating coil 11 via the cable 14. As a result, an induced current is induced by the AC on the inner surface of the housing 3 which confronts the heating coil 11. Thus, the inner surface of the housing 3 is heated by the induced current.

Figure 2:
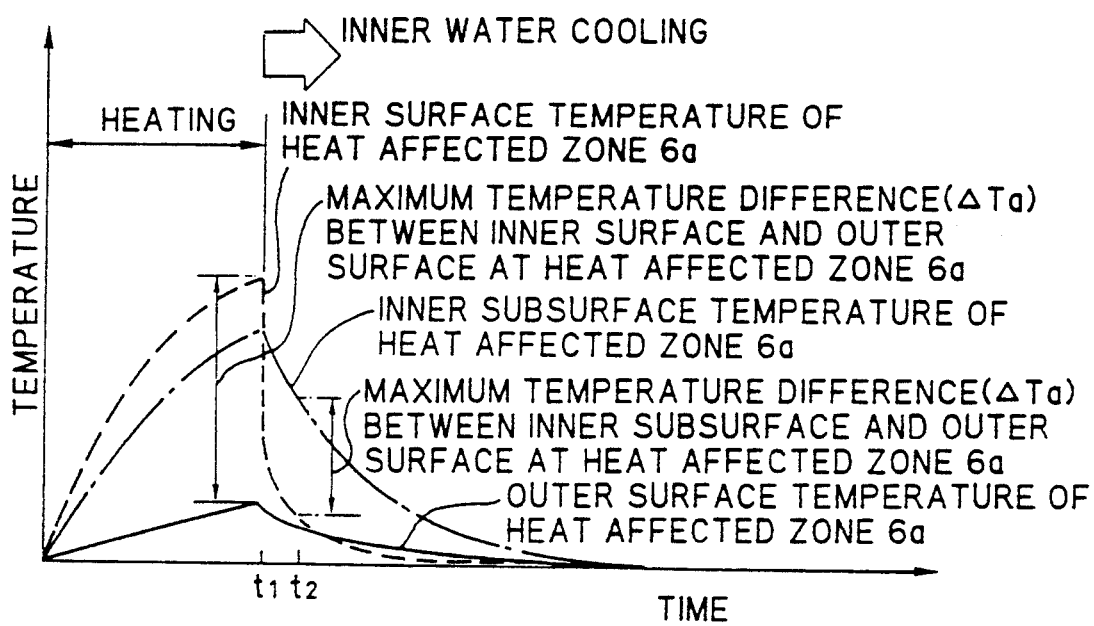
FIG. 2 is a graph which illustrates the relationship between temperature and time at the heat treatment of the housing in primary water of the reactor pressure vessel.

Since the circumferential weld 2 disposed outside the housing 3 and the heat affected zone 6a disposed above it are cooled since they are positioned in contact with primary water in the reactor pressure vessel in a direct manner, the difference in rise of temperature between the inner surface and the outer surface of the portion of the heat affected zone 6a is, as shown in FIG. 2, sufficiently large to generate the maximum temperature difference ($\Delta Ta$) max in the heating process. As described above, by enlarging the temperature difference between the inner surface and the outer surface, the inner surface of the housing 3 in the portion higher than the circumferential weld 2 is compressive-yielded while the outer surface is tensile-yielded.

Figure 3:
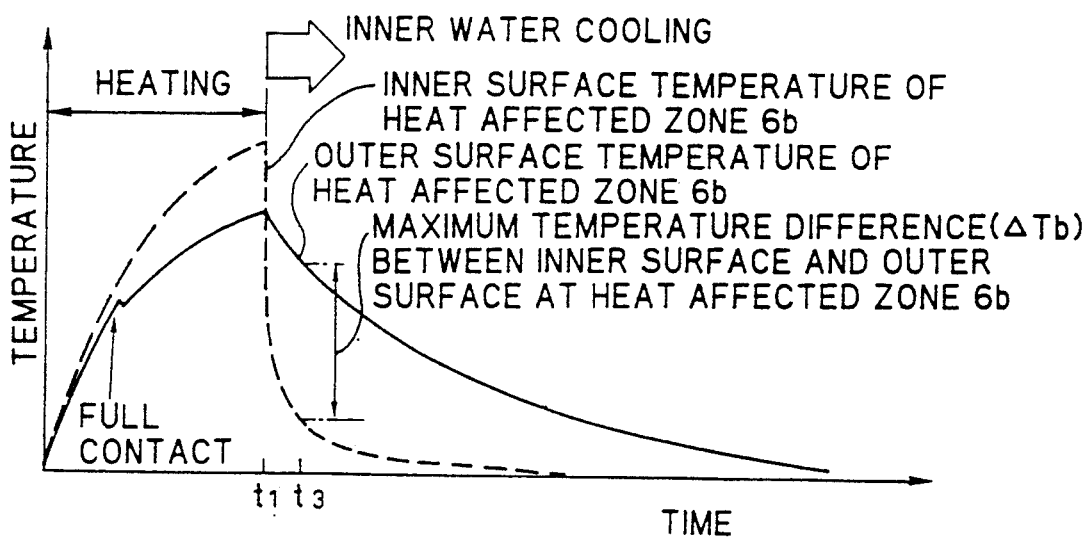
FIG. 3 is a graph which illustrates the relationship between temperature and time at the heat treatment of the housing disposed outside primary water of the reactor pressure vessel.

On the other hand, since the heat affected zone 6b disposed below the circumferential weld 2 is positioned in the hole formed in the bracket plate 1, it cannot obtain the cooling effect by means of the primary water in the reactor pressure vessel. Therefore, as shown in FIG. 3, the temperature of the inner surface and that of the outer surface of the heat affected zone 6b are similarly raised. As a result, the inner surface and the outer surface of the housing 3 in the portion below the circumferential weld 2 do not generate a large temperature difference as is taken place in the portion higher than the circumferential weld 2.

The reason why the temperature rise curve of the outer surface is curved lies in a fact that the temperature is temporarily lowered because heat is absorbed due to contact of the housing 3 with the bracket plate 1 caused from a thermal expansion.

Figure 4:
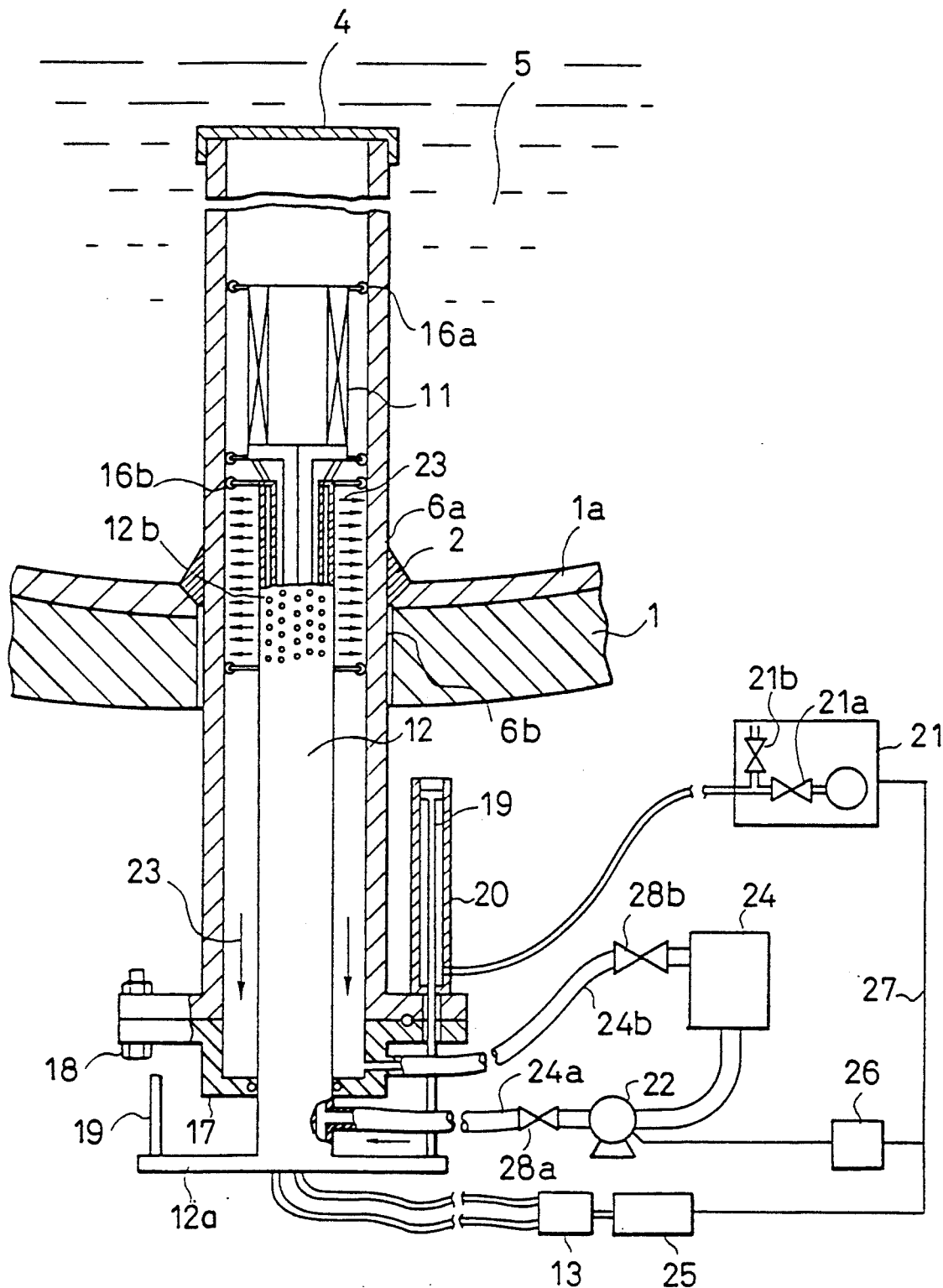
FIG. 4 is a schematic partial cross sectional view which illustrates a heat treatment equipment of the housing according to the first embodiment of the present invention in a state in which the housing is cooled with jetted water.

When the power supply to the heating coil 11 is stopped by the power supply and control unit 25, heating is stopped. After heating has been stopped, the valve 21a is opened so that pressure is further supplied into the lower chamber of the cylinder 20. As a result, the piston rod 19 is, as shown in FIG. 4, further retracted into the cylinder 20, causing the heating coil 11 and the cooling pipe 12 to be upward moved in the housing 3. The above-described upward movements cause the central portion in the vertical direction of the region, in which the nozzle holes 12b formed in the cooling pipe 12 present, to be quickly upward moved to the position which corresponds to the height of the circumferential weld 2. Thus, the regions of the circumferential weld 2 and the heat affected zones 6a and 6b can be made confront the region in which the nozzle holes 12b are present. In this state, the valve 21a is closed so that the upward movements of the heating coil 11 and the cooling pipe 12 are stopped.

Simultaneously or prior to the above-described operations, the pump 22 is operated by the pump control unit 26. Furthermore, the valves 28a and 28b are closed until the upward movements of the cooling pipe 12 is stopped. After the upward movement of the cooling pipe 12 has been stopped, the valves 28a and 28b are opened. When the valves 28a and 28b are opened, cooling water 23 in the water reserving tank 24 is, by the pump 22, supplied to the water passage formed between the inner tube and the outer tube of the cooling pipe 12. Subsequently, it can jet through the nozzle holes 12b to the heated regions of the inner surface of the housing 3 as shown in FIG. 4.

As an alternative to this, jetting of cooling water 23 through the nozzle holes 12b may be kept before the cooling pipe 12 is raised to its uppermost position and the cooling pipe 12 may be moved upwards while jetting cooling water 23. Another arrangement may be employed in which the valve 28a is, as described above, is closed until the cooling pipe 12 is upward moved and the valve 28a is opened so as to jet cooling water 23. According to the latter case, the overall region of the heating portion can be quickly cooled. The above-described valves and the power supply and control unit are operated in such a manner that the valves and the power supply and the control unit are disposed in remote positions from the housing 3 and they are operated at the remote positions.

During the above-described cooling process, the outer surface temperature of the heat affected zone 6a is moderately lowered, while the inner surface of the heat affected zone 6a is significantly quickly cooled because it is cooled by jetted water.

Therefore, the temperature of the portion of the heat affected zone 6a which is slightly inner in the direction of the thickness than the inner surface of it and that of the inner surface of the heat affected zone 6a become different. The temperature difference generated as described above has the maximum temperature difference ($\Delta Ta$) 'max after a certain time (t2 seconds) of cooling by jetted water.

The outer surface temperature of the other heat affected zone 6b is moderately lowered even after the inner surface has been cooled by jetted water. However, the inner surface temperature of the heat affected portion 6b is the maximum temperature difference ($\Delta$Tb) max from the outer surface temperature after t3 seconds of rapid cooling by jetted water.

That is, when heating is stopped, a tensile stress is generated in the outer surface of the heat affected zone 6a and a compressive stress is generated in the inner surface of the same due to the maximum temperature difference {DTa} max between the inner surface and the outer surface of the heat affected portion 6a due to the above-described sequential heat treatment operations.

Furthermore, a tensile stress is generated in the inner surface of the heat affected zone 6a at the cooling operation due to the temperature difference {$\Delta$Tb} between the inner surface of the heat affected zone 6b and a layer of the housing 3 inner in a direction of its thickness than the above-described inner surface.

By making {$\Delta$Ta} max, {$\Delta$Ta} 'max and {$\Delta$Tb} max to be $2\sigma y/\alpha E$ or more, tensile yield is generated in each of the inner surfaces of the heat affected zones 6a and 6b and the outer surface of the heat affected zone 6a. As a result, the compressive stress remains in the tensile-yielded portions after the heat treatment has been completed. In the above-made description, $\alpha y$ is the yield stress of the housing 3 in the axial direction, $\alpha$ is a thermal expansion coefficient and E is Young's modulus.

Figure 5:
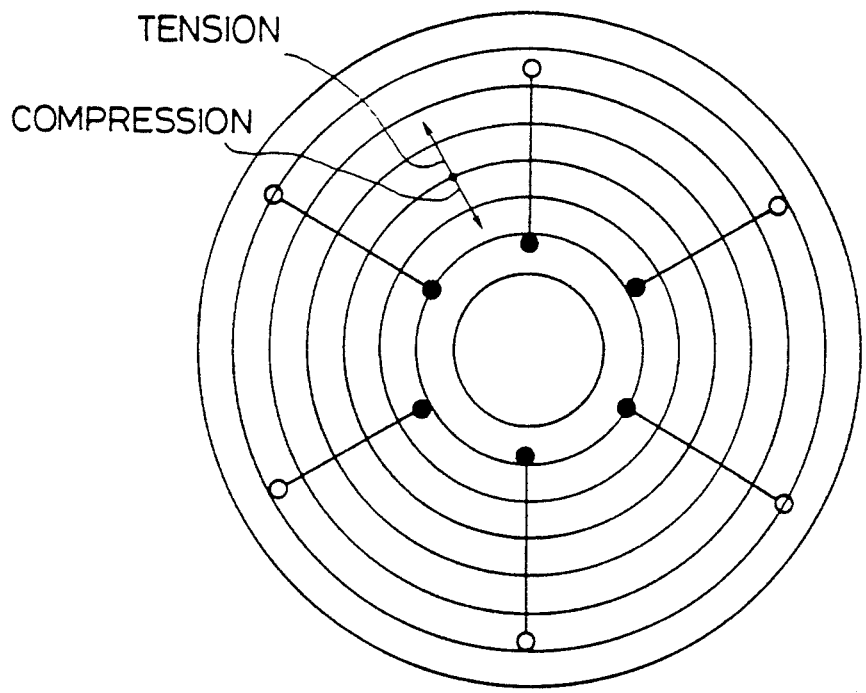
FIG. 5 is a graph which illustrates residual stress distribution of the housing which has been heat-treated by a method according to the present invention.

Although the tensile stress remains in the heat affected zones 6a and 6b in the welded state, the residual stress due to welding can be relaxed by the compressive stress obtainable after the heat treatment has been completed. The residual stress distribution in the inner and the outer surfaces of the heat affected zone 6b, which has been heat-treated, is shown in FIG. 5 where the residual stress on the inner surface designated by black dots is compressive stress.

Cooling water 23 jetted into the housing 3 through the nozzle holes 12b moves downward in the housing until it is received in the lower cover 17. Cooling water 23 accumulated in the lower cover 17 passes through the pipe 24b so as to be returned to the upper layer in the water reservoir tank 24. As a result, cooling water 23 in the water reservoir tank 24 is given pressure from the pump 22 so as to pass through a circular water passage constituted by the pipe 24a, the cooling pipe 12, nozzles 12b, space between the housing 3 and the cooling pipe 12, the lower cover 17, the pipe 24b and the water reservoir tank 24.

Figure 6:
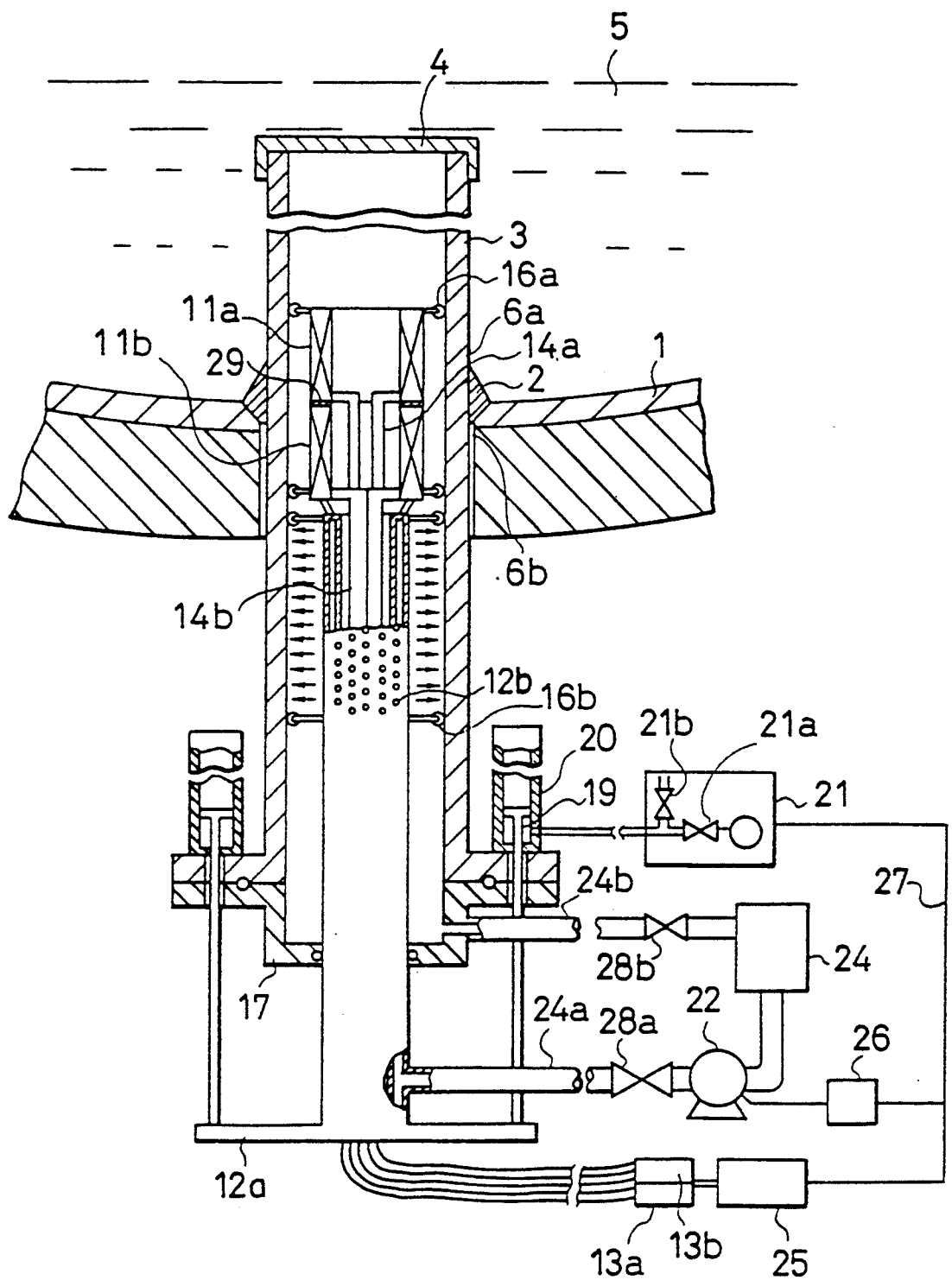
FIG. 6 is a schematic partial cross sectional view which illustrates the heat treatment equipment for the housing of the reactor pressure vessel according to a second embodiment of the present invention.

Then, a second embodiment of the present invention will now be described with reference to FIG. 6. The second embodiment is structured by modifying the first embodiment as follows, where other portions are the same as those according to the first embodiment and their descriptions are omitted here:

As shown in FIG. 6, the modified point is the arrangement of the heating coil which is, according to this embodiment, constituted by heating coils 11a and 11b in the form of vertically-disposed two stages. These two-stage heating coils 11a and 11b are individually arranged heating coils. The thus arranged heating coils 11a and 11b forming the two stages are vertically disposed while holding an electrically insulating member 29 therebetween.

Furthermore, the heating coil 11a is connected to a transformer 13a by a power supply cable 14a, while the heating coil 11b is connected to a transformer 13b by a power supply cable 14b.

The two heating coils 11a and 11b are independently controlled by the two transformers 13a and 13b. Since other structures are the same as those of the apparatus shown in FIG. 1, their descriptions are omitted here.

According to the thus-constituted heat treatment apparatus, the electric current to be supplied to each of the heating coils 11a and 11b, the frequency, the time at which heating is started and the time at which the same is completed can be individually controlled.

The heat capacity of the portion of the housing adjacent to the heat affected zone 6a which is positioned in contact with primary water 5 in the reactor pressure vessel is large, while that of the portion of the same adjacent to the heat affected zone 6b which is not positioned in contact with primary water 3 in the reactor pressure vessel is small. Therefore, if heat is generated in the housing 3 by a single coil arranged as shown in FIG. 1, the temperature of the portion adjacent to the heat affected zone 6a which is positioned in contact with primary water in the reactor vessel cannot be easily raised in comparison to the portion adjacent to the heat affected zone 6b.

However, by using the heating coils vertically disposed to form the two stages according to the second embodiment, time delay heating can be performed in such a manner that an electric current is supplied to the heating coil 11a earlier than the electricity supply to the heating coil 11b. Therefore, the inner surfaces of the heat affected zones 6a and 6b can be simultaneously heated because the temperature of the inner surface of the heat affected zone 6a can be easily raised while eliminating a time delay from the temperature rise of the heat affected zone 6b the temperature of which can be easily raised.

In the case where heating of the heat affected zone 6a and and that of the heat affected zone 6b are commenced simultaneously, the electric current to be supplied to the heating coil 11a is arranged to be larger than that to be supplied to the heating coil 11b. As a result, the inner surfaces of the two heat affected zones 6a and 6b can be simultaneously raised to a predetermined temperature level which is the level immediately before starting cooling.

Similarly to the first embodiment, the inner surfaces of the two heat affected zones 6a and 6b are cooled with water jetted through the nozzle holes 12b.

According to the second embodiment, similarly to the first embodiment, the compressive stress can be allowed to remain on the inner surfaces of the heat affected zones 6a and 6b and the outer surface of the heat affected zone 6a. Furthermore, since the heating coils vertically disposed to form the two stages and arranged in such a manner that heating value emitted from them can be independently controlled are used, the upper portion of the circumferential weld 2 which is cooled by primary water in the reactor pressure vessel and the lower portion of the same which is not cooled can be satisfactorily equally heated. Therefore, the compressive stress can be allowed to remain while being distributed uniformly.

Figure 7:
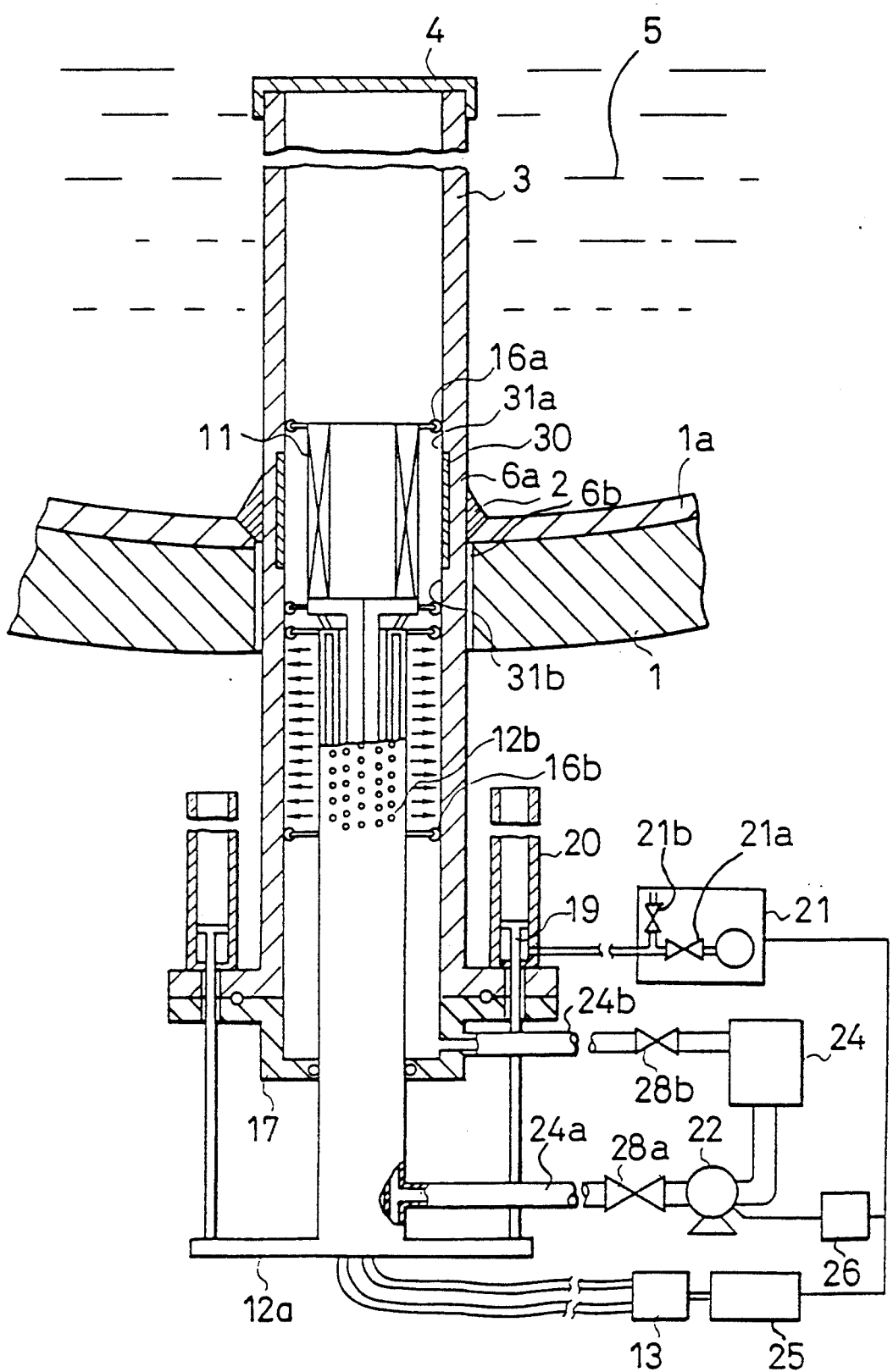
FIG. 7 is a schematic partial cross sectional view which illustrates the heat treatment equipment for the housing of the reactor pressure vessel according to a third embodiment of the present invention.

A third embodiment of the present invention is shown in FIG. 7. The third embodiment is structured by modifying the first embodiment in the following manner such that:

The surface layer of the inner surface of the housing 3 corresponding to the heat affected zones 6a and 6b of the circumferential weld 2 is subjected to remelting by a non-filler electrode without using any filler metal. As an alternative to this, a treatment is performed in which a filler metal is welded by a filler electrode while using the filler metal. As a result, an improved inner surface layer 30 is formed. Subsequently, the heating coil 11 is disposed in the housing 3 in such a manner that the improved inner surface layer 30 and its heat affected zones 31a and 31b are covered so that the heat treatment is performed in the manner described with reference to FIG. 1.

As a result, the compressive stress can be allowed to remain on the inner surface of each of the heat affected zones 6a, 6b, 31a and 31b and the outer surface of the heat affected zone 6a.

Since the other arrangements are the same as those according to the first embodiment, their descriptions are omitted here.

According to the third embodiment, the tensile residual stress on the heat affected zones 31a and 31b at the time of the surface reform treatment can be relaxed as well as that on the improved inner surface layer 30 of the inner surface of the housing 3.

The circumferential weld 2 and its inner surface of each of the heat affected zones 6a and 6b reveal improved the resistance against stress corrosion cracking and corrosion fatigue, that is, corrosive environment strength because the improved inner surface layer is formed. In addition, the above-described relaxation of the tensile residual stress will further improve the corrosive environment strength.

Furthermore, the relaxation of the tensile residual stress of the improved inner surface layer of the heat affected zones 31a and 31b will improve the corrosive environment strength of the above-described portion.

Figure 8:
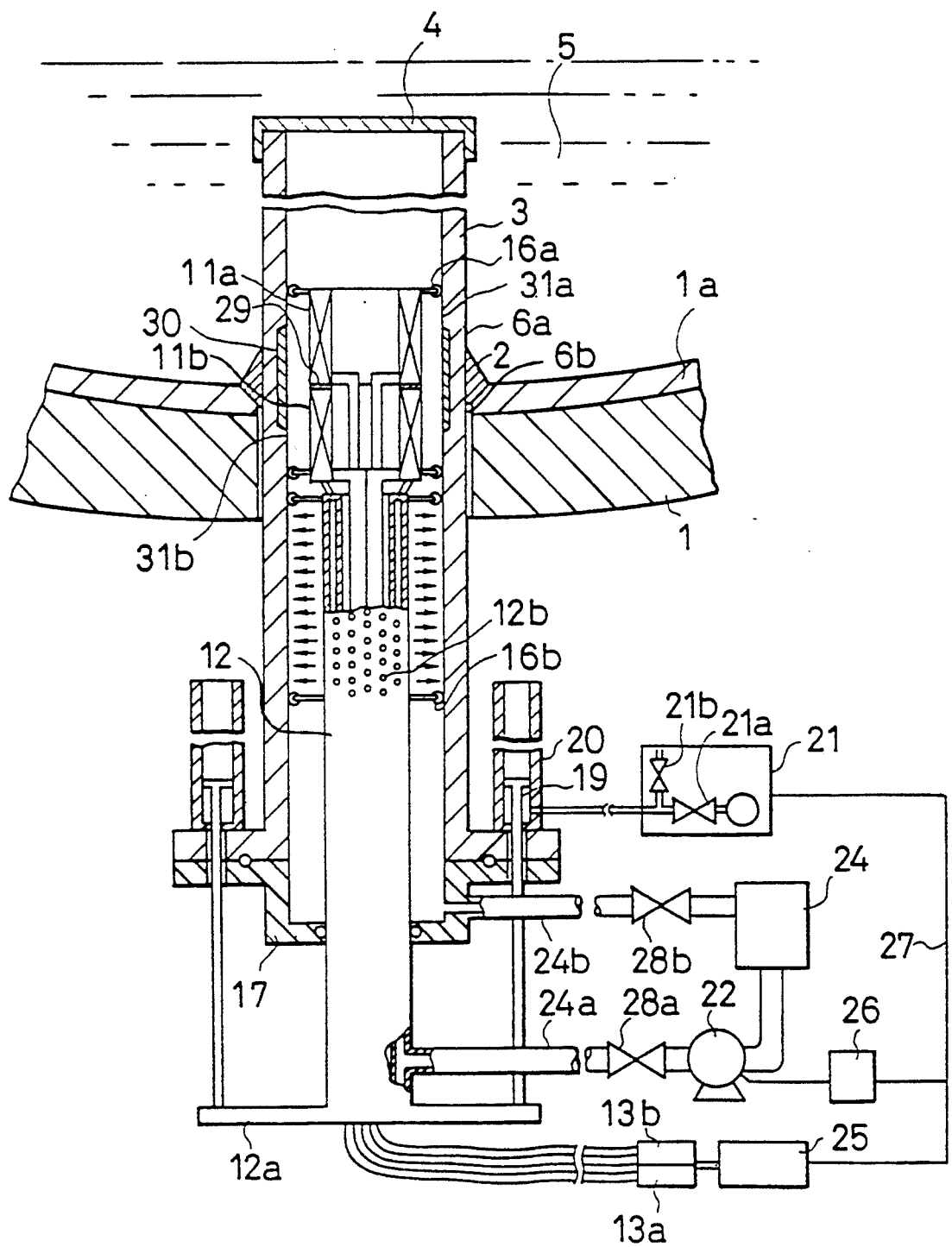
FIG. 8 is a schematic partial cross sectional view which illustrates the heat treatment equipment for the housing of the reactor pressure vessel according to a fourth embodiment of the present invention.

A fourth embodiment of the present invention is shown in FIG. 8.

The fourth embodiment shown in FIG. 8 is arranged in such a manner that the heating coil according to the third embodiment shown in FIG. 7 and related elements (the power supply cable 14 and the transformer 13) connected to the heating coil are replaced by the heating coils 11a and 11b which forms the two stages while holding the electrically insulating member 29, the power supply cables 14a, 14b and the transformers 13a and 13b.

Since the other arrangements are the same as those according to the third embodiment, their descriptions are omitted here.

According to the fourth embodiment, similarly to the third embodiment, the corrosive environment strength can be improved due to the presence of the improved inner surface 30. Furthermore, the relaxation of the tensile residual stress of the heat affected zones 31a and 31b due to the improved inner surface 30 will further improve the corrosive environment strength of the above-described portions.

In addition, since the heating coils vertically disposed to form the two stages and arranged in such a manner that heating value emitted from them can be independently controlled are used, the upper portion of the circumferential weld 2 which is cooled by primary water in the reactor pressure vessel and the lower portion of the same which is not cooled can be satisfactorily equally heated. Therefore, the compressive stress can be allowed to remain while being distributed uniformly.

Furthermore, the electric currents supplied to the upper heating coil 11a and the lower heating coil 11b are arranged in such a manner that a larger electric current is supplied to the upper heating coil 11a than that supplied to the lower heating coil 11b. As an alternative to this, the electric current is supplied to the upper heating coil 11a earlier than the supply of the electric current to the lower heating coil 11b. Therefore, insufficient heating can be eliminated at the time of cooling the inner surface of the housing 3 with jetted water. In addition, cooling of the heat affected zone 31a and that of the heat affected zone 31b can be simultaneously performed.

Figure 9:
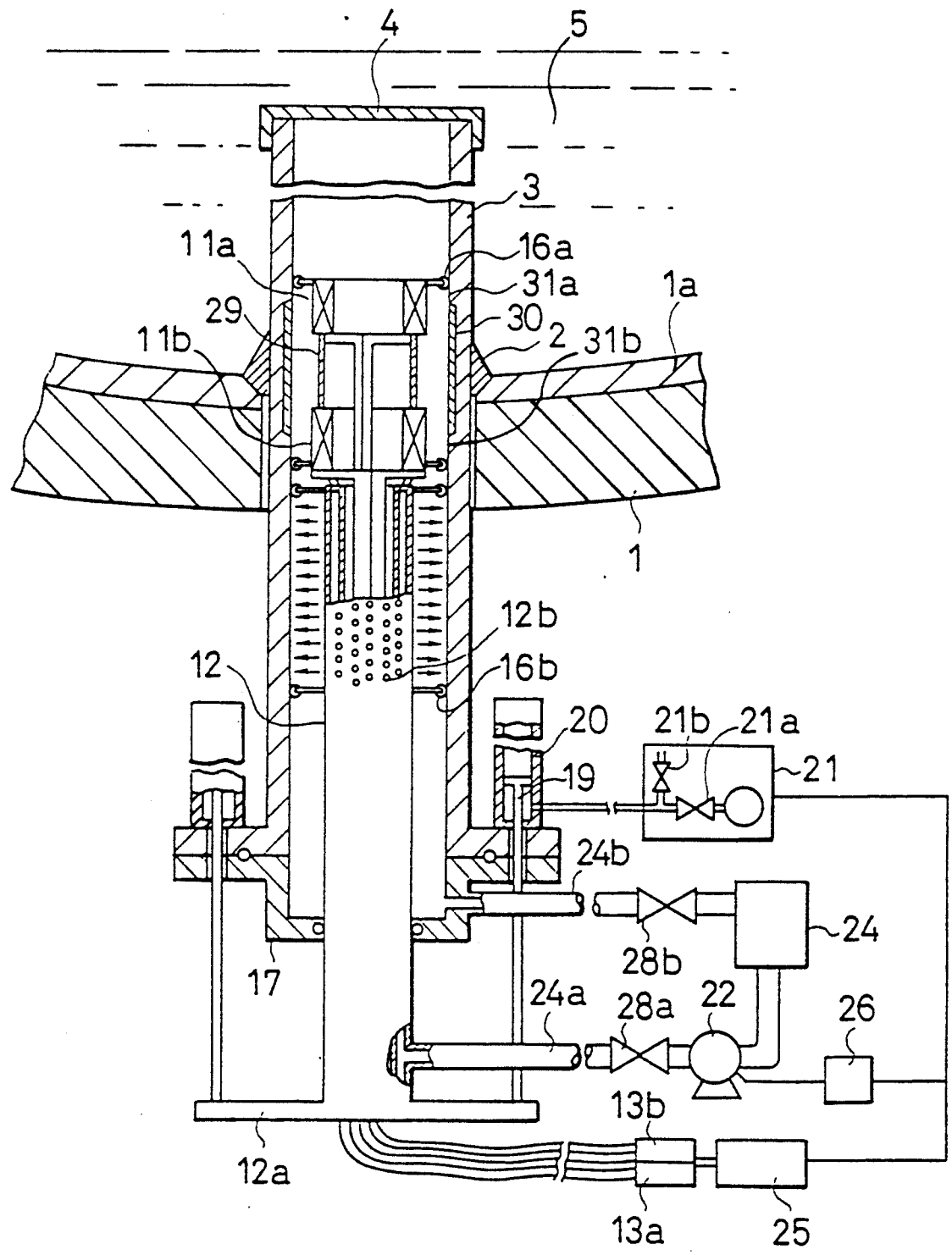
FIG. 9 is a schematic partial cross sectional view which illustrates the heat treatment equipment for the housing of the reactor pressure vessel according to a fifth embodiment of the present invention.

A fifth embodiment of the present invention is shown in FIG. 9. The fifth embodiment is structured by modifying the fourth embodiment in the following manner:

The vertical length of the insulating member 29 is enlarged so that only the portion in the vicinity of the heat affected zones 31a and 31b of the improved surface layer of the inner surface of the housing 3 is induction-heated.

According to this embodiment, the axial (vertical direction) length of the improved surface layer 30 is made longer those that according to the third and fourth embodiments.

As a result, the heat affected zones 31a and 31b due to the surface reform treatment are positioned away from the circumferential weld 2.

That is, this embodiment has an advantage in that the heat affected zones 31a and 31b due to the surface reform treatment are positioned away from the structural discontinuous portion in which the circumferential weld 2 is positioned.

According to this embodiment, the upper heating coil 11a heats the heat affected zone 31a and the lower heating coil 11b heats the heat affected zone 11b until they are tensile-yielded. Then, the cooling pipe 11 is moved upward so as to quickly cool the heat affected zones 31a and 31b, which have been heated, with water jetted from the nozzle holes 12b.

After the heat treatment has been completed, since the improved inner surface 30 is present and the tensile stress on the heat affected zones 31a and 31b due to the surface reform treatment can be relaxed, the corrosive environment strength can be improved.

In addition, since the heating coils vertically disposed to form the two stages and arranged in such a manner that heating value emitted from them can be independently controlled are used, the upper portion of the circumferential weld 2 which is cooled by primary water in the reactor pressure vessel and the lower portion of the same which is not cooled can be satisfactorily equally heated. Therefore, the compressive stress can be allowed to remain while being distributed uniformly.

Furthermore, the electric currents supplied to the upper heating coil 11a and the lower heating coil 11b are arranged in such a manner that a larger electric current is supplied to the upper heating coil 11a than that supplied to the lower heating coil 11b. As an alternative to this, the electric current is supplied to the upper heating coil 11a earlier than the supply of the electric current to the lower heating coil 11b. Therefore, insufficient heating can be eliminated at the time of cooling the inner surface of the housing 3 with jetted water. In addition, cooling of the heat affected zone 31a and that of the heat affected zone 31b can be simultaneously performed.

Then, a specific structure of the heating coil for use to perform induction heating will now be described with reference to FIG. 10.

Figure 11:
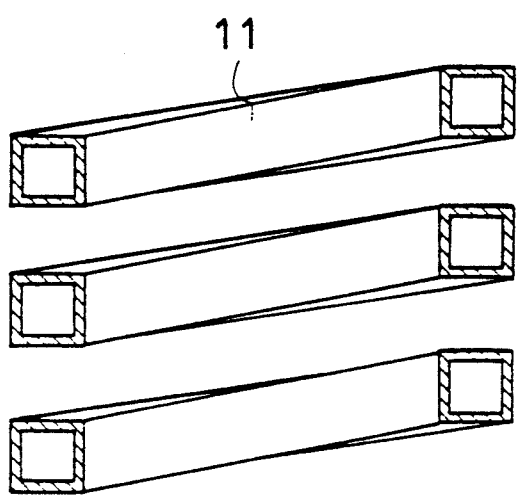
FIG. 11 is a partially enlarged cross sectional view which illustrates a portion of the heating coil shown in FIG. 10.

The heating coil 11 has the cross section in the form of a hollow rectangular shape as shown in FIG. 11, the heating coil 11 having the overall shape in the form of a screw. Cooling water 41 for cooling the heating coil 11 is passed through the above-described hollow rectangular cross section of the heating coil 11. Cooling water 41 is compressed by a pump 42 so as to be introduced into the coil 11 through its end portion before it is discharged from it through another end into the tank 43.

Figure 12:
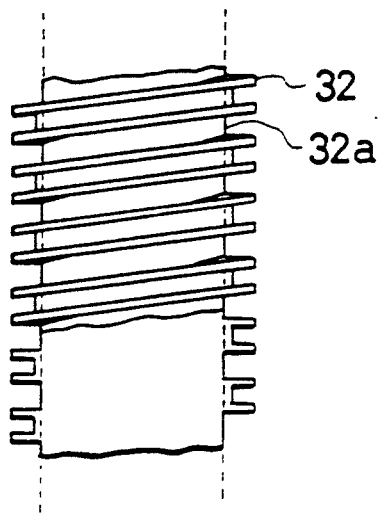
FIG. 12 illustrates a process of manufacturing the heating coil shown in FIG. 10.
Figure 13:
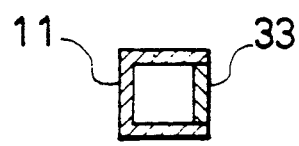
FIG. 13 is a cross sectional view of the heating coil shown in FIG. 10.
Figure 16:
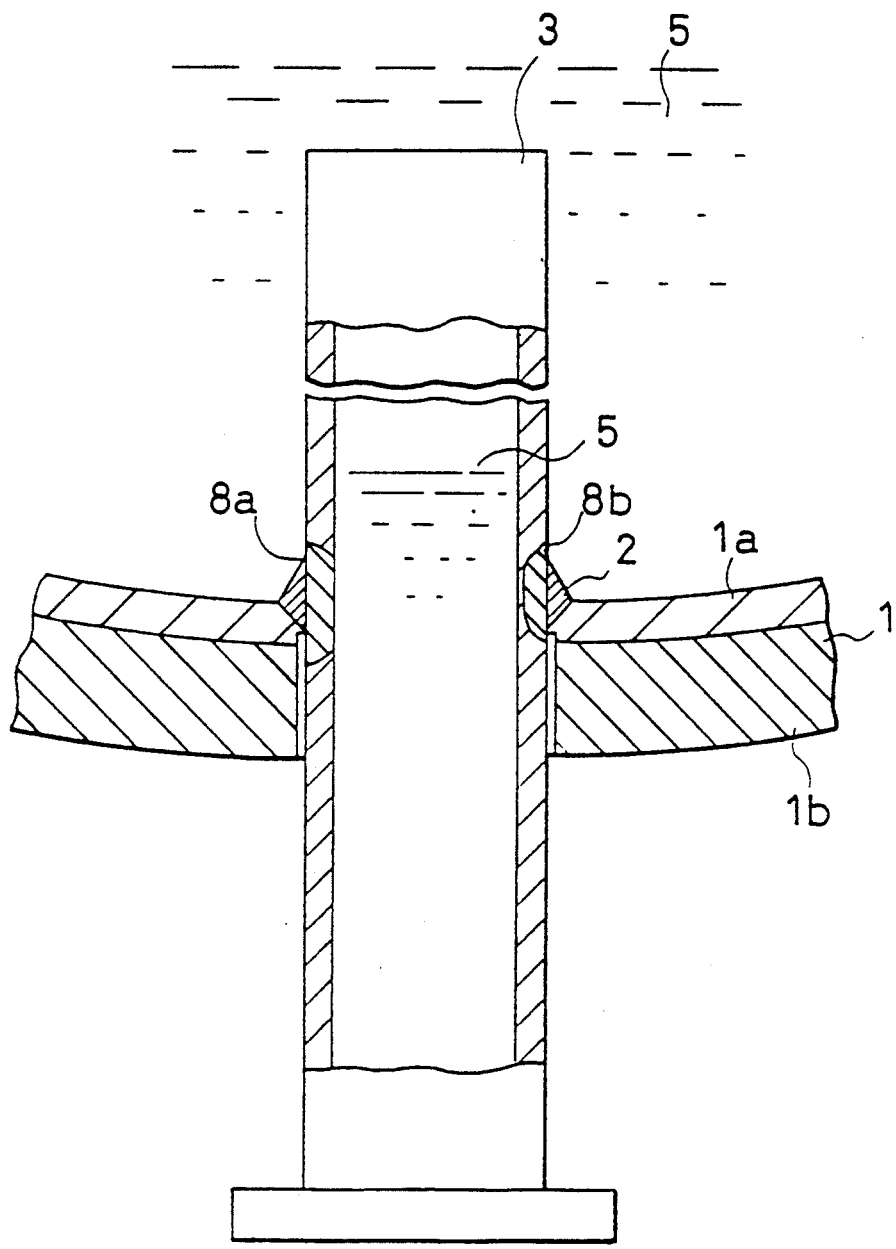
FIG. 16 is a partial cross sectional view which illustrates a welded portion and its sensitized zone of the heat affected zone of the housing of the reactor pressure vessel.
Figure 17:
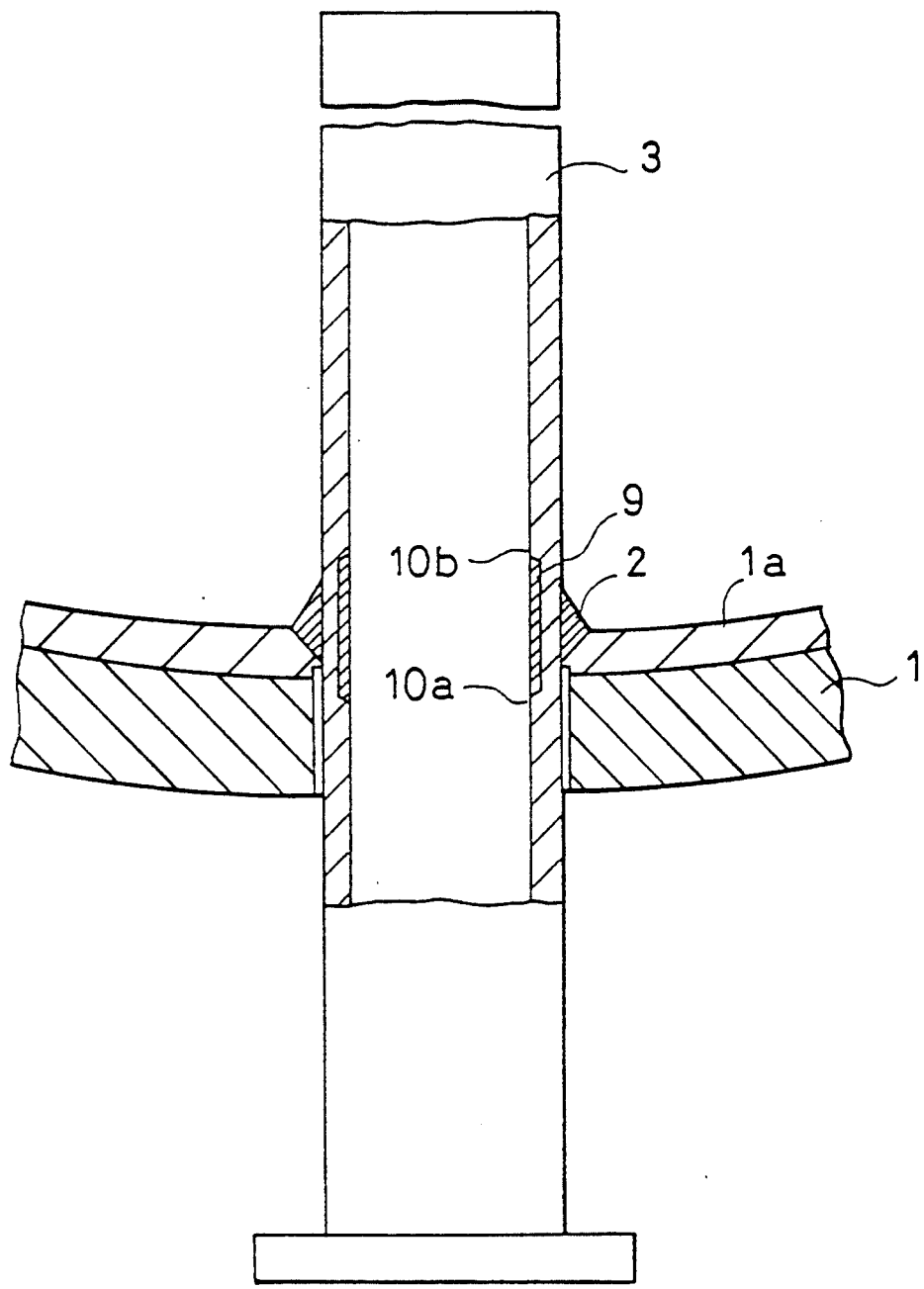
FIG. 17 is a partial cross sectional view which illustrates the surface reformed portion formed in the inner surface of the housing of the reactor pressure vessel.

The coil 11 is manufactured by forming, in a metal bar, two screw-like grooves 32 having different depths as shown in FIG. 12 before the inside portion is hollowed out along the dashed line. As a result, bottom 32a of either of the two screw-like grooves is removed, causing one screw-like groove in the form of a coil to be left. Then, a cover 33 is joined to the coil having one U-groove as shown in FIG. 13. Thus, a screw-like coil having the hollow cross sectional shape can be manufactured. According to the thus arranged manufacturing method, a coil can be accurately manufactured even if its diameter is considerably small. The rollers 16a made of bakelite and rotates while being positioned in contact with the inner surface of the housing are fastened to the coil 11.

FIG. 14 illustrates a double helix complex coil 34 which is manufactured by forming, in a metal bar, four helix grooves having different bottom depths on every other helix before the central portion of the metal bar is hollowed out and the deeper bottoms are removed by cutting As a result, two coils with U-shaped groove section can be manufactured. Then, a cover is joined to the groove with the U-shaped groove section so that the two screw-like hollow coil with rectangular section is manufactured.

A coil 34a of the two coils has the nozzle holes 12b formed to face outwards as shown in FIG. 15. Cooling water 23 in the reservoir tank 24 is pressurized by the pump 22 so as to be supplied into the coil 34a through the pipe 24a via the vale 28a. As a result, water can be jetted from the coil 34a. A high frequency power supply is connected to another coil 34b into which cooling water 41 supplied by a pump 42 is introduced through an end portion thereof, water being then discharged through another end portion of the same before it is discharged into the tank 43. As a result, the coil 34b can be utilized as a heating coil. The rollers 16a and 16b made of bakelite and rolling while being positioned in contact with the inner surface of the housing are fastened to each of the coils 34a and 34b.

The coils 34a and 34b are connected to each other by electrically insulating member 45 so as to be integrally formed so that strength which enables the integrated body to stand erect.

In a case where the heat treatment is performed by using the complex coil 34 composed of the coils 34a and 34b, the necessity of upward moving the coil at the time of the cooling operation performed after the heating operation can be eliminated. That is, cooling can be commenced simultaneously with the stop of the heating operation at the position at which the heating operation has been performed. Furthermore, the heating operation can be stopped after the cooling operation has been commenced.

By using the above-described complex coil 34, cooling process can be commenced immediately after the heating process has been completed. Therefore, the maximum value $\{\Delta Ta\}'$ of the temperature difference can be enlarged. Therefore, an advantage can be realized in that the stress relaxation effect of the inner surface of the housing can be improved.

Figure 10:
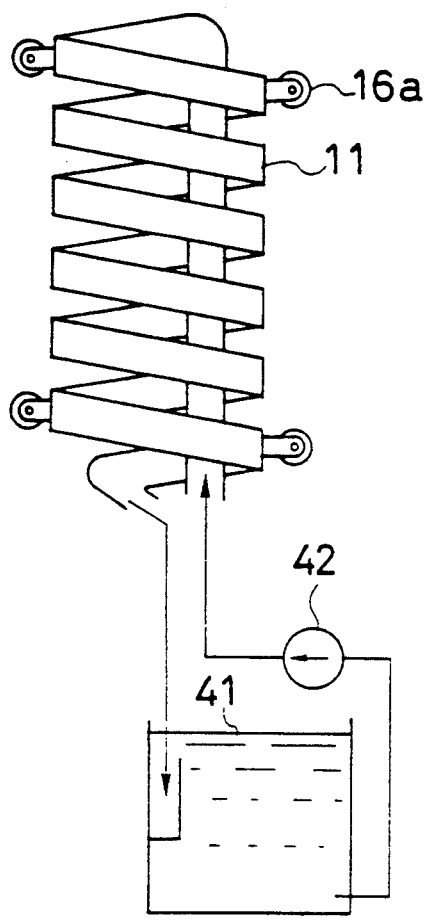
FIG. 10 illustrates a heating coil adaptable to each of the embodiments of the present invention.

The one or two heating coils shown in FIG. 10 are used according to any one of the first to fifth embodiments. If the complex coil shown in FIG. 14 is used in place of the heating coil according to any one of the first to fifth embodiments, the necessity of providing the cooling pipe 11 in the form of the duplex pipe and the lifting device can be eliminated.

Figure 18:
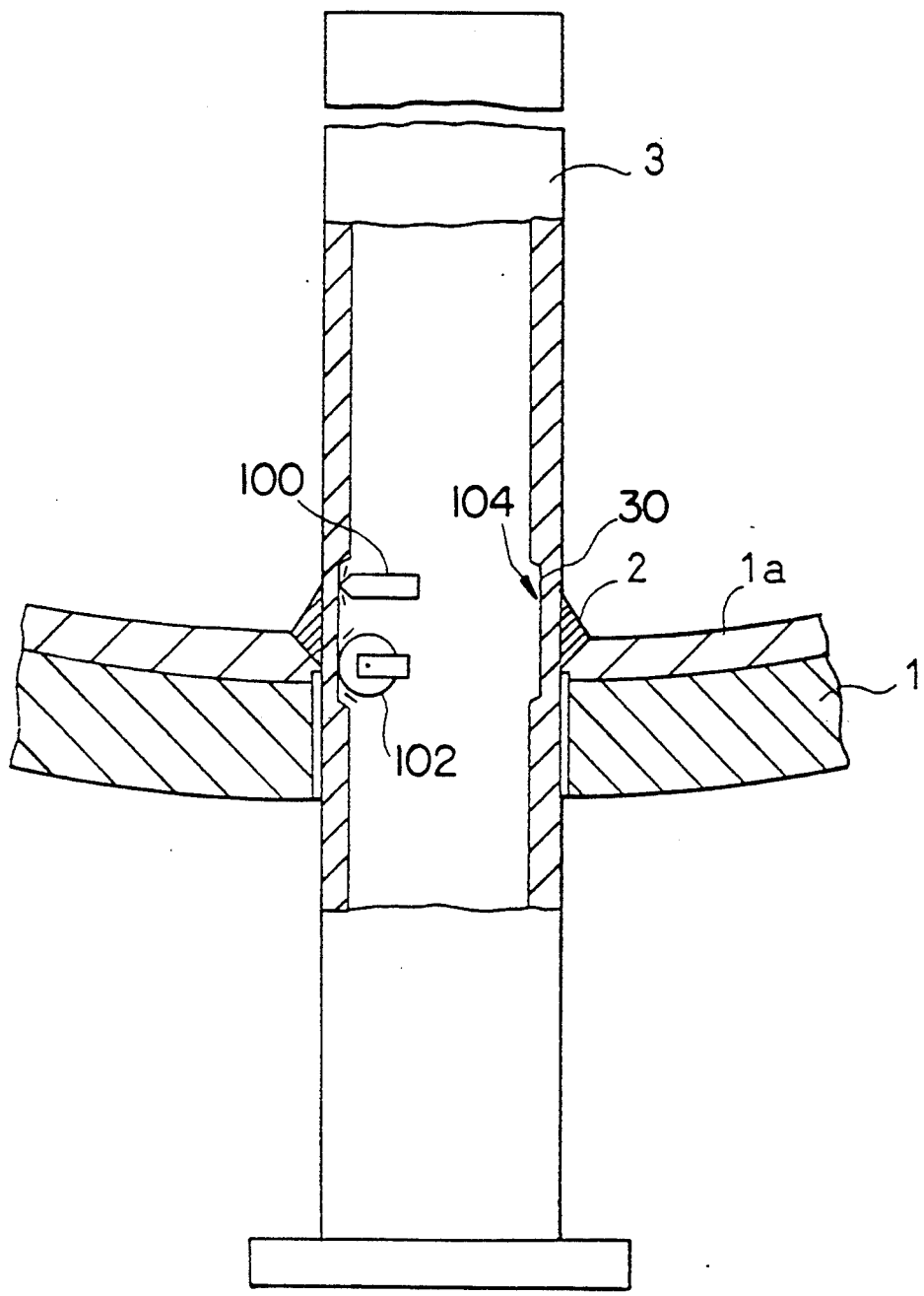
FIG. 18 is a partial cross-sectional view which illustrates a cut and grind operation being applied to the inner surface of the housing of the reactor pressure vessel.

FIGS. 18–20 illustrate a cut or ground operation being applied to an inner surface of the housing of the reactor pressure vessel, and a thin metal sleeve inserted into the cut or ground portion. More particularly, in FIG. 18 there is shown the inside portions of the housing which correspond to the circumferential weld and the heat effected zone due to the welding being cut or ground using a TIG welder 100 or grinder 102, respectively, after the housing has been sealed, to result in a cut or ground portion 104. A corrosion resistant thin metal sleeve such as, for example, a sleeve 106 illustrated in FIG. 20, is inserted into the cut or ground portion before it is remelted so as to make a cladding portion with respect to the cut or ground portion so that the inner surface of the housing is formed. The inside portions of the housing which correspond to the clad portion and the heat effected zone due to the welding are heated by using the heating means inserted into the hollow space of the housing from a lower portion so as to compressive-yield the inner surface of the housing and tensile-yield the outer surface. The inner portions of the yielded housing are then cooled by the cooling means inserted into the yielded hollow space from a lower portion so as to tensile-yield the inner surface of the housing.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A method of treating a hollow housing member penetrating an end bracket of a reactor pressure vessel and being secured to said end bracket by a circumferential weld at an intermediate portion of said hollow housing member, said method comprising the steps of:

preventing leakage of cooling water maintained in said reactor pressure vessel into said hollow housing member by putting a seal on top of said hollow housing member;

heating an inner surface of said hollow housing member at a portion within a heat affected zone which is disposed adjacent to said circumferential weld by using heating means inserted into a hollow space of said hollow housing member from a lower portion of said hollow housing member to compressive-yield said inner surface of said hollow housing member and tensile-yield an outer surface of said hollow housing member at a portion within said heat affected zone; and cooling said inner surface of said hollow housing member after heating to tensile-yield said inner surface of said hollow housing member by using cooling means inserted into said hollow housing member from said lower portion of said housing member, whereby compressive stress is allowed to remain in said heat affected zone.

2. A method according to claim 1, wherein said hollow housing member is an incore monitor housing and is treated by supplying a larger heating value to an upper portion of a region heated by said heating means, said upper portion being higher than a lower portion with respect to a portion in a vicinity of said circumferential weld.

3. A method of treating a hollow housing member penetrating an end bracket of a reactor pressure vessel and being secured to said end bracket by a circumferential weld at an intermediate portion of said hollow housing member, said method comprising the steps of:
   preventing leakage of cooling water maintained in said reactor pressure vessel into said hollow housing member by putting a seal on top of said hollow housing member;
   cutting out an inside portion of said hollow housing member, which inside portion corresponds to a heat affected zone disposed adjacent to said circumferential weld to produce a cut out portion;
   inserting a corrosion resistant thin metal sleeve in said cut out portion;
   melting said corrosion resistant thin metal sleeve to make a clad portion in said cut out portion;
   heating said clad portion by using heating means inserted into a hollow space of said hollow housing member from a lower portion of said hollow housing member to compressive-yield said clad portion and tensile-yield an outer surface of said hollow housing member; and
   cooling said clad portion after heating by using cooling means inserted into said hollow space of said hollow housing member from said lower portion of said hollow housing member, whereby compressive stress is allowed to remain in said clad portion.

4. A method according to claim 3, wherein a larger heating value is supplied to an upper portion of a region heated by said heating means, said upper portion being higher than a lower portion with respect to a portion in a vicinity of said circumferential weld.

5. A heat treatment equipment for heat-treating a hollow housing member of a reactor pressure vessel, wherein said hollow housing member penetrating an end bracket of said reactor pressure vessel and being secured to said end bracket by a circumferential weld at an intermediate portion of said hollow housing member, said heat treatment equipment comprising:
   an induction heating coil which is inserted into said hollow housing member and is vertically distributed to cover a vertical region of a heat affected zone disposed adjacent to said circumferential weld; and
   a nozzle hole portion which is inserted into said hollow housing member and is distributed in a region corresponding to said heat affected zone, wherein said nozzle hole portion including nozzle holes which are formed in a hollow pipe member, said injunction heating coil is fastened in series to an upper portion of said hollow pipe member, said hollow pipe member providing a water passage to said nozzle holes and connected to cooling water supply means, and said hollow pipe member and said heating coil are supported by a lifting drive device for movement thereof within said hollow housing member.

6. A heat treatment equipment for heat-treating a hollow housing member of a reactor pressure vessel, wherein said hollow housing member penetrating an end bracket of said reactor pressure vessel and being secured to said end bracket by a circumferential weld at an intermediate portion of said hollow housing member, said heat treatment equipment comprising:
   a plurality of induction heating coils which are inserted into said hollow housing member and vertically disposed to form two stages to cover a vertical region of a heat affected zone disposed adjacent to said circumferential weld, wherein each of said plurality of induction heating coils independently includes means for adjusting a heating value; and
   a nozzle hole portion which is inserted into said hollow housing member and is distributed in a region corresponding to said heat affected zone, wherein said nozzle hole portion includes nozzle holes which are formed in a hollow pipe member, said plurality of induction heating coils is fastened in series to an upper portion of said hollow pipe member, said hollow pipe member providing a water passage to said nozzle holes and connected to cooling water supply means, and said hollow pipe member and said heating coil are supported by a lifting drive device for movement thereof within said hollow housing member.

7. A heat treatment equipment according to claim 6, wherein a heating value is generated by an upper induction heating coil of said plurality of induction heating coils.

8. A heat treatment equipment according to claim 5, wherein said heating coil has a hollow cross-sectional portion, wherein said hollow cross-sectional portion is arranged to be a fluid passage through which cooling fluid passes.

9. A heat treatment equipment for heat-treating a hollow housing member penetrating an end bracket of said reactor pressure vessel and being secured to said end bracket by a circumferential weld at an intermediate portion of said hollow housing member, said heat treatment equipment comprising:
   a double helix coil which is inserted into said hollow housing member and being vertically distributed to cover a vertical directional range of a heat affected zone disposed adjacent to said circumferential weld, said double helix coil being present in a form of double thread screw-like coils, wherein each of said double thread screw-like coils is a coil with a hollow cross sectional portion, and one of said double thread screw-like coils is a cooling coil which has nozzle holes facing an inner surface of said hollow housing member, said cooling coil is connected to cooling water supply means, and the other of said double thread screw-like coils is an induction heating coil; and
   a lifting drive device for supporting said double thread screw-like coils.

10. A heat treatment equipment according to claim 9, wherein said heating coil has a hollow cross-sectional portion, said hollow cross-sectional portion being arranged to be a fluid passage through which cooling fluid passes.

11. A heat treatment equipment for heat-treating a hollow housing member of a reactor pressure vessel, wherein said hollow housing member penetrating an end bracket of said reactor pressure vessel and being secured to said end bracket by a circumferential weld at an intermediate portion of said hollow housing member, said heat treatment equipment comprising:
   an induction heating device which is inserted into said hollow housing member and which has a plurality of heating coils vertically disposed away from one another to confront an upper portion and a lower portion of a heat affected zone disposed adjacent to said circumferential weld at an inner surface of said housing member; and a cooling device having nozzle holes distributed to cover an area from said upper portion to said lower portion of said heat affected zone wherein cooling water supply means is connected to said cooling device.

12. A heat treatment equipment according to claim 11, wherein said plurality of heating coils and said cooling device are integrally fastened and are supported for being vertically driven by a lifting device.

13. A heat treatment equipment according to claim 11, wherein each coil of said plurality of heating coils independently includes means for adjusting a heating value.

14. A heat treatment equipment according to claim 11, wherein a heating value generated by an upper heating coils is made to be larger than that generated by a lower heating coil.

15. A heat treatment equipment according to claim 11, wherein each coil of said plurality of heating coils has a hollow cross-sectional portion, said hollow cross-sectional portion being arranged to be a fluid passage through which cooling fluid passes.

16. A heat treatment equipment according to claim 15, wherein said plurality of induction heating coils comprise an upper heating coil and a lower heating coil, said upper heating coil and said lower heating coil are disposed vertically away from each other so that a central portion of said upper heating coil in a direction of its height is positioned at an upper end portion of said heat affected zone disposed adjacent to said circumferential weld at said inner surface of said hollow housing member and a central portion of said lower heating coil in a direction of its height is positioned at a lower end portion of said heat affected zone.

17. A heat treatment equipment according to claim 15, wherein said heating coils have a hollow cross-sectional portion and a device for supplying a cooling medium is connected to said hollow cross-sectional portion.

18. A heat treatment equipment for heat-treating a hollow housing member of a reactor pressure vessel, wherein said hollow housing member penetrating an end bracket of said reactor pressure vessel and being secured to said end bracket by a circumferential weld at an intermediate portion of said hollow housing member, said heat treatment equipment comprising:

a seal applied to a top of said hollow housing member;

a cooling pipe in a form of a duplex tube having an outer diameter with which said cooling pipe is inserted into a hollow portion of said hollow housing member in a portion below said seal, from a lower portion of said housing member;

nozzle holes formed in an outer tube of said duplex tube and distributed in a range covering a region to be heat-treated, said nozzle holes facing an inner surface of said hollow housing member;

induction heating coils fastened to an upper portion of said cooling pipe, having an outer diameter with which said induction heating coils is inserted into said hollow portion of said hollow housing member below said seal, from said lower portion of said hollow housing member and distributed in a range covering said region to be heat-treated;

a guide fastened to said induction heating coils and said cooling pipe to guide said induction heating coils and said cooling pipe along a central axis of said hollow housing member;

a power supply cable electrically connected to said heating coils and arranged to pass through an inner tube of said duplex tube and extend from an end of said cooling pipe;

a transformer electrically connected to said power supply cable to supply power from a power supply to said power supply cable;

a lower cover in which said cooling pipe is fitted to move vertically and which is fastened to a lower end portion of said hollow housing member;

a circulation fluid passage for fluidly connecting an inside portion of said lower cover and an inside portion of said outer tube of said duplex tube;

a tank for a cooling medium disposed at an intermediate portion of said circulation fluid passage;

a pump provided for said circulation fluid passage for giving circulating pressure to said cooling medium in said tank; and a lifting device mechanically connected to said cooling pipe.

19. A heat treatment equipment according to claim 18, wherein said induction heating coils are composed of an upper heating coil and a lower heating coil vertically combined with each other to form two stages via an electrically insulating member, said power supply cable is composed of one power supply cable electrically connected to said upper heating coil and another power supply cable connected to said lower heating coil and two transformers possessing different power supply performances are provided so that a first of said two transformers has a larger power supply performance than a power supply performance of a second of said two tranformers.

20. A heat treatment equipment according to claim 18, wherein said induction heating coils have a hollow cross-sectional portion and a device for supplying a cooling medium is connected to said hollow cross-section portion.

21. A heat treatment equipment for heat-treating a hollow housing member of a reactor pressure vessel, wherein said hollow housing member penetrating an end bracket of said reactor pressure vessel and being secured to said end bracket by a circumferential weld at an intermediate portion of said hollow housing member, said heat treatment equipment comprising:

a seal applied to a top of said hollow housing member;

a cooling coil which is inserted into said hollow housing member in a portion below said seal, from a lower portion of said hollow housing member, said cooling coil being distributed in a range covering a region to be heat-treated;

nozzle holes formed in said cooling coil to face outside of said cooling coil;

an induction heating coil which is distributed to form double thread screw-like coils together with said cooling coil in a range covering said region to be heat-treated;

a guide fastened to said induction heating coil and said cooling coil to guide said induction heating coil and said cooling coil along a central axis of said housing member;

a power supply cable electrically connected to said heating coil;

a transformer electrically connected to said power supply cable to supply power from a power supply via said power supply cable to said induction heating coil;

a lower cover for supporting said cooling coil and said induction heating coil and combined with a lower end opening of said housing;

a circulation fluid passage for fluidly connecting an inside portion of said lower cover and said cooling coil;

a tank for cooling a medium disposed at an intermediate portion of said circulation fluid passage; and a pump provided for said circulation fluid passage for giving circulating pressure to said cooling medium in said tank.

22. A heat treatment equipment according to claim 21, wherein said induction heating coil has a hollow cross-sectional portion and a device for supplying said cooling medium is connected to said hollow cross-sectional portion of said induction heating coil.

* * * * *